(12) United States Patent
Miyoshi et al.

(10) Patent No.: US 7,886,759 B2
(45) Date of Patent: Feb. 15, 2011

(54) FUEL CUTOFF VALVE

(75) Inventors: Keiji Miyoshi, Aichi-ken (JP);
Tomohide Aoki, Aichi-ken (JP);
Shinobu Kagamiuchi, Nagoya (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 437 days.

(21) Appl. No.: 11/705,534

(22) Filed: Feb. 13, 2007

(65) Prior Publication Data

US 2007/0186973 A1    Aug. 16, 2007

(30) Foreign Application Priority Data

Feb. 15, 2006    (JP)    .............................. 2006-037408

(51) Int. Cl.
*F16K 24/04*    (2006.01)
(52) U.S. Cl. ........................................ 137/202; 137/43
(58) Field of Classification Search .................... 137/39,
137/41, 43, 202, 587
See application file for complete search history.

(56) References Cited

U.S. PATENT DOCUMENTS

| | | | | | |
|---|---|---|---|---|---|
| 4,579,135 | A | * | 4/1986 | Sakata et al. ................... | 137/39 |
| 4,694,847 | A | * | 9/1987 | Szlaga ........................... | 137/39 |
| 4,807,656 | A | * | 2/1989 | Ito ................................ | 137/43 |
| 5,234,013 | A | * | 8/1993 | Roetker et al. ................. | 137/43 |
| 5,749,347 | A | * | 5/1998 | Torii et al. .................... | 123/516 |
| 6,062,250 | A | * | 5/2000 | Takahashi .................... | 137/202 |
| 6,347,640 | B1 | * | 2/2002 | Meyer ........................... | 137/43 |
| 6,591,855 | B2 | * | 7/2003 | Nishi et al. ................... | 137/202 |
| 7,571,740 | B2 | * | 8/2009 | Kaneko et al. ............... | 137/202 |
| 2001/0050104 | A1 | * | 12/2001 | Nishi et al. ................... | 137/202 |
| 2009/0211649 | A1 | * | 8/2009 | Miura et al. ................. | 137/202 |

FOREIGN PATENT DOCUMENTS

JP    B2-3064824    5/2000

* cited by examiner

*Primary Examiner*—Stephen Hepperle
*Assistant Examiner*—Craig Price
(74) *Attorney, Agent, or Firm*—Posz Law Group, PLC

(57) ABSTRACT

A fuel cutoff valve comprises a casing and a float mechanism having a float and a seat portion. An upper vent hole is formed in the upper wall portion of the float, and a side portion communication hole is formed in the side wall portion. The passage area of the side portion communication hole is set so as to allow a large volume of vapors entering the float chamber to escape into the valve chamber. The passage area of the upper vent hole is set so that vapor entering the float chamber when the vehicle inclines escapes into the valve chamber, and the float chamber fills with fuel lifting the float, whereas when the vehicle turns sharply, the float is lifted without the float chamber filling with fuel.

12 Claims, 4 Drawing Sheets

FUEL CUTOFF VALVE

This application claims the benefit of and priority from Japanese Application No. 2006-37408 filed Feb. 15, 2006, the content of which is incorporated herein by reference.

BACKGROUND OF THE INVENTION

1. Field of the Invention

The present invention relates to a fuel cutoff valve that is mounted on an upper wall of a fuel tank, and opens and closes a connection conduit to connect the fuel tank and outside.

2. Description of the Related Art

The upper part of a fuel tank is typically equipped with a full tank regulator valve connected to a canister, discovered in Japanese Patent No. 30648924, or with a fuel cutoff valve (rollover valve). The valves, by opening and closing at a prescribed fuel level, ensures venting of the fuel tank to the outside, as well as preventing fuel from flowing to the outside. A rollover valve is designed to shutoff fuel to the outside at a fuel level above the full tank level in order to ensure venting when the vehicle leans or slaloms during driving.

In line with increasing diversity of vehicle types and larger cabin space in recent years, the issue of making fuel tanks flatter has become a topic of interest. However, fuel cutoff valves adapted for use in flat tanks must meet the following conditions. Specifically, in order to reduce the proportion of dead space in the upper part of the fuel tank, it is desirable for the fuel level at which valve closes (valve closing level) to be as high as possible. Also, when the fuel in the fuel tank surges during sudden turning of the vehicle or the like, since in the case of such a sudden rise in fuel level the float will fail to rapidly keep pace with the fuel level, if the valve closure level is high for the reason mentioned previously, fuel will tend to flow to the outside of the fuel tank (into the canister); it is necessary to prevent such outflow of fuel. Where the height of the float has been reduced to afford a shorter fuel cutoff valve adapted for a flatter fuel tank, since the float tends to bob up due to rising vapor produced when a large volume of fuel vapors within the fuel tank flows into the canister, it will be necessary to design the float to resist ascension caused by the rising vapor so as to prevent closure of the fuel tank.

SUMMARY

An advantage of some aspects of the invention is provided with a fuel cutoff valve permitting a high valve closure level to be established, while at the same time preventing flow of fuel to the outside when the vehicle turns sharply, as well as designing the valve to resist closure caused by a rising vapor produced by escape of fuel vapors within the fuel tank to the outside.

According to an aspect of the invention is provided with a fuel cutoff valve that is mounted on an upper wall of a fuel tank, and opens and closes a connection conduit to connect the fuel tank and outside. The fuel cutoff valve comprising: a casing forming a valve chamber for connecting the fuel tank interior with the connection conduit; and a float mechanism having (i) a float that is housed within the valve chamber and that rises and falls according to a fuel level within the valve chamber, and (ii) a seat portion disposed on an upper portion of the float, for opening and closing the connection conduit. The float includes (i) an upper wall portion furnished with the seat portion, (ii) a side wall portion extending downwardly from a periphery of the upper wall portion, (iii) a float chamber that is formed with the upper wall portion and the side wall portion, and opens at a bottom of the float, (iv) an upper vent hole formed in the upper portion of the float for connecting the float chamber with the valve chamber, and (v) a side communicating hole formed in the side wall portion below the upper vent hole and connecting the float chamber with the valve chamber. The upper vent hole is formed to have greater air flow resistance than the side communicating hole.

The fuel cutoff valve in accordance with the present invention is installed in the upper part of the fuel tank, and functions to ensure venting between the fuel tank and the outside, as well as preventing outflow of fuel from the fuel tank by means of rising with the fuel level within the fuel tank and closing off the connection conduit. Moreover, the float has a side communicating hole and an upper vent hole, with the upper vent hole being formed to have greater air flow resistance than the side communicating hole, whereby the float exhibits different behavior with different rates of rise in the fuel level.

Specifically, when vapor flows into the fuel cutoff valve due to a sudden rise in fuel level, the vapor will escape through the side communicating hole of the float so that the float will not easily rise and close off the connection conduit. Consequently, it is possible to establish a high level of shutoff pressure at which the fuel cutoff valve is shut by rising vapor produced when a large volume of fuel vapors flow from the fuel tank to the outside.

On the other hand, when fuel flows into the float chamber due to a gradual rise in fuel level, vapors within the float will escape through the upper vent hole while the float chamber fills with fuel, so the float will not rise to a high fuel level and the connection conduit will not be closed off. Consequently, the float is adapted to a system employing a flat fuel tank, for which such a high valve closure level is desirable.

Moreover, when the fuel level has risen at a high rate due to swaying of the vehicle, once the side communicating hole is closed off by the fuel in the float chamber, since the flow rate of fuel vapor venting through the upper vent hole is smaller than the flow rate of inflow with the rise in fuel level, the float will now rise rapidly and close off the connection conduit, by utilizing at least some of the buoyant force of the float chamber. Consequently, outflow of fuel to the outside during sharp turning of the vehicle can be prevented.

In a preferred embodiment of the invention, the passage area of the side communicating hole will be designed to allow vapor entering the float chamber to escape into the valve chamber so that the float is not caused to rise; and the passage area of the upper vent hole will be designed so that when the fuel level has risen at a rate slower than a prescribed rate of rise in level and the side communicating hole has become blocked off by fuel, vapor entering the float chamber will escape into the valve chamber as the float chamber fills with fuel, causing the float to rise; whereas when the fuel level has risen at a rate faster than the prescribed rate of rise in level and the side communicating hole has become blocked off by fuel, the float is caused to rise through the increasing buoyant force of the float utilizing at least some of the float chamber as buoyant force. The arrangement for establishing the air flow resistance of the upper vent hole and the side communicating hole can involve employing various different shapes and passage area for the passages, but can be achieved more simply by varying the passage area.

Herein, a rate not exceeding the prescribed rate of rise in level refers, for example, to the rate of rise in fuel level occurring when the vehicle rides up over the curb and becomes inclined. A rate exceeding the prescribed rate of rise in level refers, for example, to the rate of rise] in fuel level occurring when the vehicle sways during a sharp turn.

In a preferred embodiment for establishing air flow resistance in the present invention, there can be employed an arrangement wherein the passage area of the connection conduit is smaller than that of the side communicating hole. With this arrangement, rising vapor produced during outflow of a large volume of fuel vapors will raise the pressure in the upper space of the valve chamber, checking the ascending force of the float.

In yet another preferred embodiment of the invention, the casing may comprise a bottom plate for closing off the bottom opening of the valve chamber; and the bottom plate may comprise basal communicating holes formed facing the inner side of the profile of the lower portion of the float, and connecting the fuel tank with the valve chamber. By means of this arrangement, fuel entering through the basal communicating holes during swaying of the vehicle comes into direct contact with the lower face of the float and does not flow directly to the outside through the connection conduit.

The seat portion may be integrally formed with the float, or constituted as a separate element. Specifically, in a preferred embodiment of the invention, the float mechanism may comprise a rubber seat member installed on the upper part of the float, with the seat portion being formed on the upper face of the seat member. By means of this arrangement, even when the fuel cutoff valve is submerged, the seat member will flex when seated in the seal portion of the connection conduit, and can exhibit high sealing ability.

These and other objects, features, aspects, and advantages of the present invention will become more apparent from the following detailed description of the preferred embodiments with the accompanying drawings.

DESCRIPTION OF THE PREFERRED EMBODIMENTS (1) General Arrangement of Fuel Cutoff Valve 10

Figure 1:
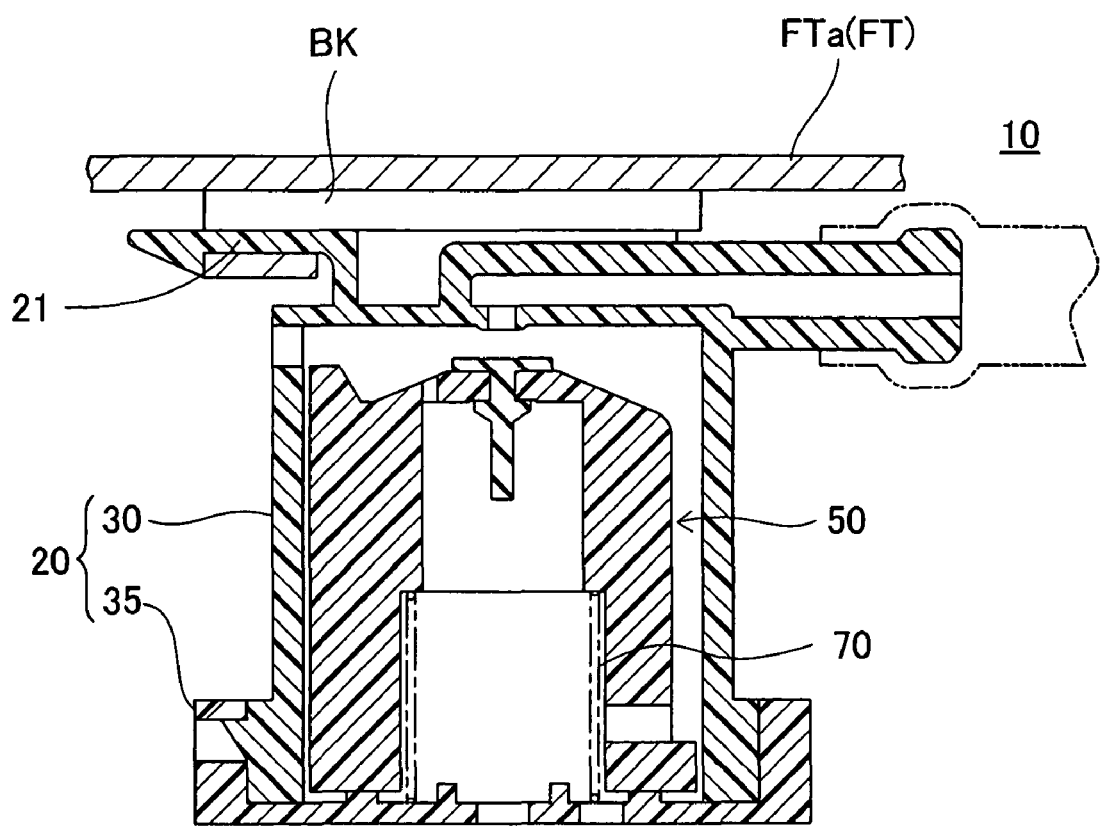
FIG. 1 is a sectional view showing a fuel cutoff valve attached to the upper wall of a fuel tank of an automobile in an embodiment of the invention.

FIG. 1 is a sectional view showing a fuel cutoff valve 10 attached to the upper part of a fuel tank FT of an automobile in one embodiment of the invention. The fuel cutoff valve 10 is of so-called in-tank type installed inside the fuel tank FT. The fuel cutoff valve 10 functions as a valve for preventing fuel from flowing to the outside in the event of a rise in fuel level within the fuel tank FT when the vehicle inclines or turns rapidly for example. The fuel cutoff valve 10 comprises as its principal parts a casing 20, a float mechanism 50, and a spring 70. A valve mounting portion 21 is integrally formed in the upper part of the casing 20 and is attached to the inside of the fuel tank FT via a bracket BK which is welded to the lower face of a tank upper wall FTa of the fuel tank FT.

(2) Arrangement of Fuel Cutoff Valve 10 Parts

Figure 2:
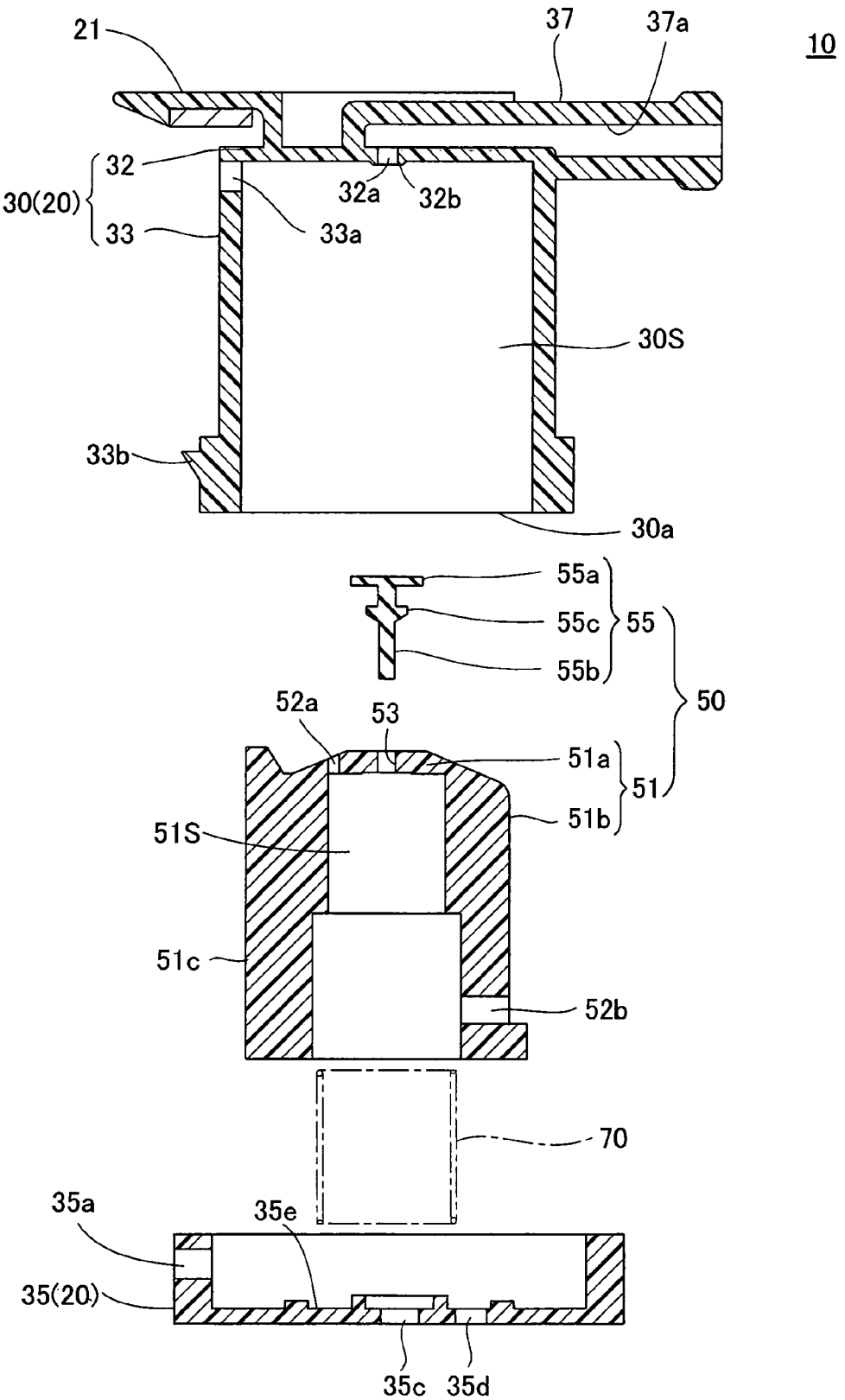
FIG. 2 is an exploded sectional view of the fuel cutoff valve.

FIG. 2 is an exploded sectional view of the fuel cutoff valve. In FIG. 2, the casing 20 comprises a casing body 30, and a bottom plate 35 installed on the bottom of the casing body 30. The casing body 30 comprises a upper wall 32 and a side wall 33 extending in cylindrical shape downward from this upper wall 32, forming a cup shaped valve chamber 30S surrounded by the upper wall 32 and the side wall 33 and having a bottom opening 30a at the bottom end. A connection conduit 32a perforates the center portion of the upper wall 32, with the connection conduit 32a on the valve chamber 30S side constituting a seal portion 32b. A communicating hole 33a connecting the fuel tank FT interior with the valve chamber 30S is formed in the upper portion of the side wall 33, while a fastening claw 33b is formed in the lower portion thereof. The fastening claw 33b is for the purpose of attaching the bottom plate 35. The bottom plate 35 is a component for providing closure to the bottom opening 30a of the casing body 30; by means of engaging the fastening claw 33b in a fastening hole 35a formed in the outside peripheral portion thereof the bottom plate 35 is installed so as to provide closure to the bottom opening 30a of the casing body 30. The bottom plate 35 is perforated by a central communicating hole 35c and a communicating hole 35d surrounding the communicating hole 35c. These basal communicating holes 35c, 35d are formed so as to face the lower face of the float mechanism 50. A spring support portion 35e for supporting the lower end of the spring 70 is formed on the upper face of the bottom plate 35.

A pipe portion 37 extending outwardly from the center is formed in the upper part of the casing body 30. A pipe passageway 37a is formed within the pipe portion 37; this pipe portion 37 connects at a first end thereof to the valve chamber 30S via the connection conduit 32a of the casing body 30, and at the other end thereof to the canister end.

Figure 3:
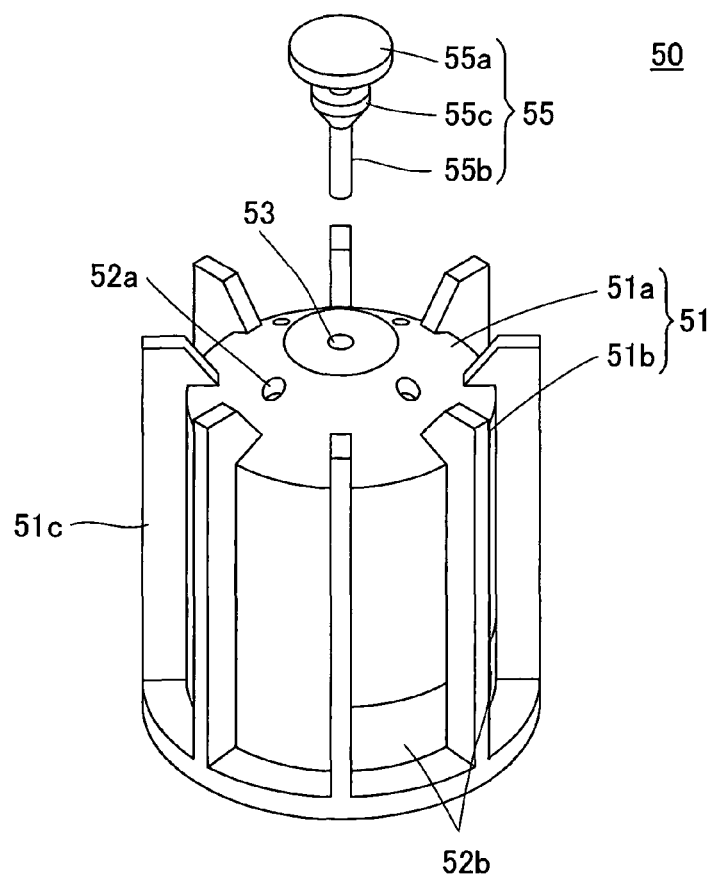
FIG. 3 is an exploded perspective view of the float mechanism.

FIG. 3 is an exploded perspective view of the float mechanism 50. In FIG. 2 and FIG. 3, the float mechanism 50 comprises a float 51, and a seat member 55 installed on top of the float 51. The float 51 is designed with a receptacle shape comprising a horizontally formed upper wall portion 51a, and a side wall portion 51 of cylindrical shape extending downward from the periphery of the upper wall portion 51a; the interior space thereof constitutes a float chamber 51S for producing buoyant force. Guide ribs 51c are formed on the outside periphery of the float 51. The guide ribs 51c are formed at eight locations spaced equally apart around the circumference of the side wall portion 51b of the float 51, and project in rib shape in the vertical direction.

Upper portion vent holes 52a are formed in the upper wall portion 51a of the float 51. The upper vent holes 52a are formed at four locations surrounding the seat member 55 and pass through the upper wall portion 51a in a vertical direction. The diameter of the upper vent holes 52a can be set to ϕ1.5-3 mm, while the passage length of the upper vent holes 52a can be set to 1.5-2.5 mm, in consideration of the wall thickness of the upper wall portion 51s of the float 51. Here, the lower limits for diameter and passage length of the upper vent holes 52a will be established in consideration of avoiding blockage of the upper vent holes 52a by the surface tension of the fuel; meanwhile, as will be discussed later, the upper limits thereof will be established in consideration of their functioning as discharge paths for vapors depending on the rate of rise in fuel level. A side portion communication hole 52b is formed in the side wall portion 51b of the float 51. Here, the side portion communication hole 52b has a passage area twice that of the upper vent holes 52a, and as shall be discussed later is designed so as to function as a discharge path for vapors from the float chamber 51S to the valve chamber 30S.

The seat member 55 is supported in a valve support hole 53 formed in the center of the upper part of the float 51. The seat member 55 is formed from a pliable material (e.g. a rubber material or thermoplastic elastomer material) and comprises a disk shaped seat portion 55a, a seat support portion 55b of rod shape projecting down from the center lower part of the seat portion 55a, and a detent portion 55c formed midpoint along the seat support portion 55b; the seat support portion 55b is press-fit into the valve support hole 53, and attached to the upper part of the float 51 by means of the detent portion 55c engaging the rim of the valve support hole 53.

The spring 70 is disposed within the float chamber 51S of the float 51. The spring 70 is interposed between one end of the float 51 and the spring support portion 35e, thereby urging the float 51 upward.

(3) Operation of Fuel Cutoff Valve 10

(3)-1 Operation of Fuel Cutoff Valve 10 When Large Rising Vapor Occurs

Figure 4:
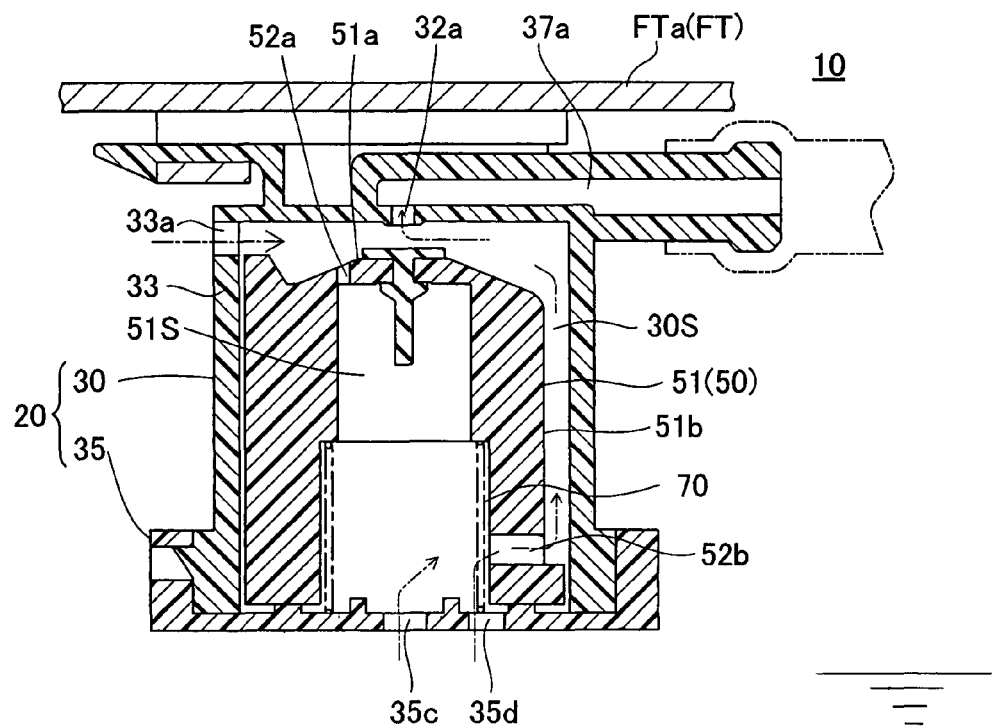
FIG. 4 shows operation of the fuel cutoff valve when large ascending vapor occurs.

FIG. 4 shows operation of the fuel cutoff valve 10. In the event that the fuel tank FT is close to the full tank level and the fuel cutoff valve 10 is in the open state, if the fuel tank tilts suddenly, accumulated vapors in the upper part of the fuel tank FT form a rising vapor and enter into the valve chamber 30S through the vent hole 33a in the side wall 33, as well as entering into the float chamber 51S through the basal communicating holes 35c, 35d in the bottom plate 35; then subsequently pass through the side portion communication hole 52b and escape through the gap between the outside periphery of the float 51 and the inside wall of the casing body 30, and thence from the gap through the connection conduit 32a and the pipe passageway 37a, to escape towards the canister. At this time, since the vapor entering into the float chamber 51S of the float 51 escapes from the side portion communication hole 52b, a high level of pressure that would cause the float 51 to rise does not develop; and since the passage area of the connection conduit 32a is smaller than the passage area of the side portion communication hole 52b, elevating force on the float 51 is checked by a rise in pressure in the upper part of the valve chamber 30S. Consequently, when a large rising vapor is produced, the fuel cutoff valve 10 does not shut off the fuel tank FT, and venting to the outside is assured.

(3)-1 Operation of Fuel Cutoff Valve 10 When the Vehicle Inclines

Figure 5:
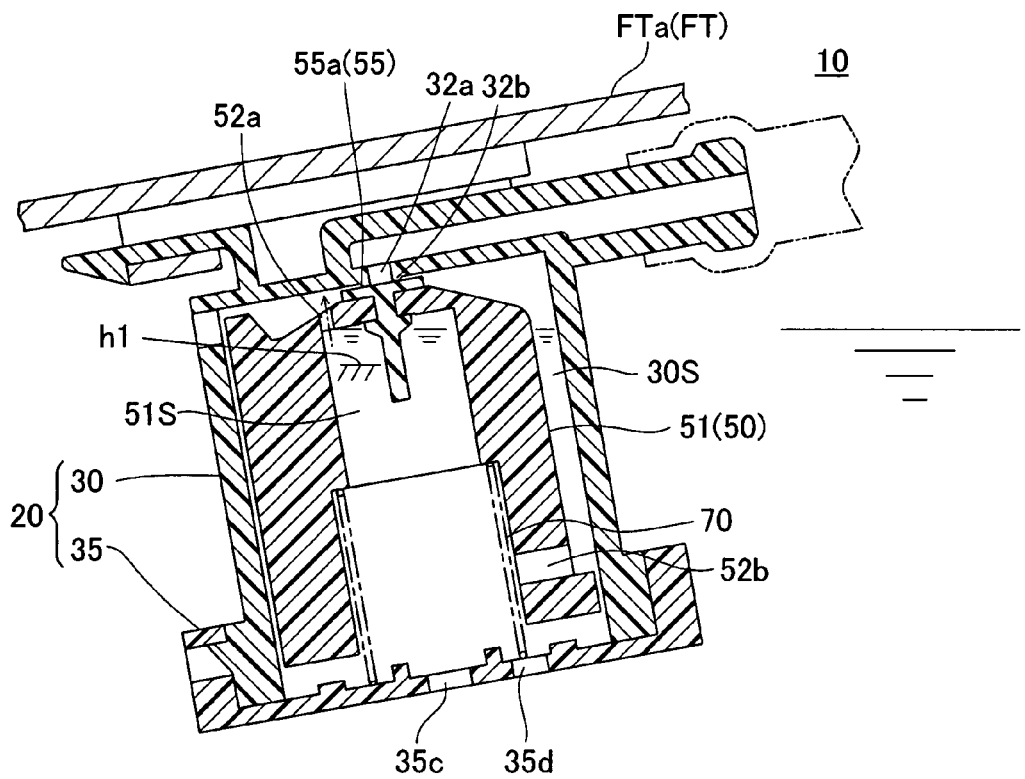
FIG. 5 shows operation of the fuel cutoff valve with the vehicle in an inclined state.

FIG. 5 shows operation of the fuel cutoff valve 10 with the vehicle in an inclining state. If the one wheel of the vehicle should ride up over the curb, or if the vehicle should incline on a sloping roadway such as hill, a gradual rise in fuel level will occur in the fuel tank FT. When the fuel level reaches the fuel cutoff valve 10 and then rises further, the fuel flows into the valve chamber 30S through the communication holes 35c, 35d in the bottom plate 35. At this time, since the rate of rise in fuel level is not particularly fast, despite the rise in fuel level, vapors within the float chamber 51S become discharged through the upper vent hole 52a, and the fuel enters into the float chamber 51S without the float 51 rising. As the fuel level exceeds the prescribed level and reaches a height of h1 within the float chamber 51S of the float 51, the float 51 rises due to the buoyant force thereof, whereupon the seat portion 55a of the seat member 55 becomes seated in the seal portion 32b to close off the connection conduit 32a. Where on the other hand the fuel level in the fuel tank FT drops, the float 51 declines in buoyant force and descends, opening up the connection conduit 32a.

(3)-1 Operation of Fuel Cutoff Valve 10 During Vehicle Sway

Figure 6:
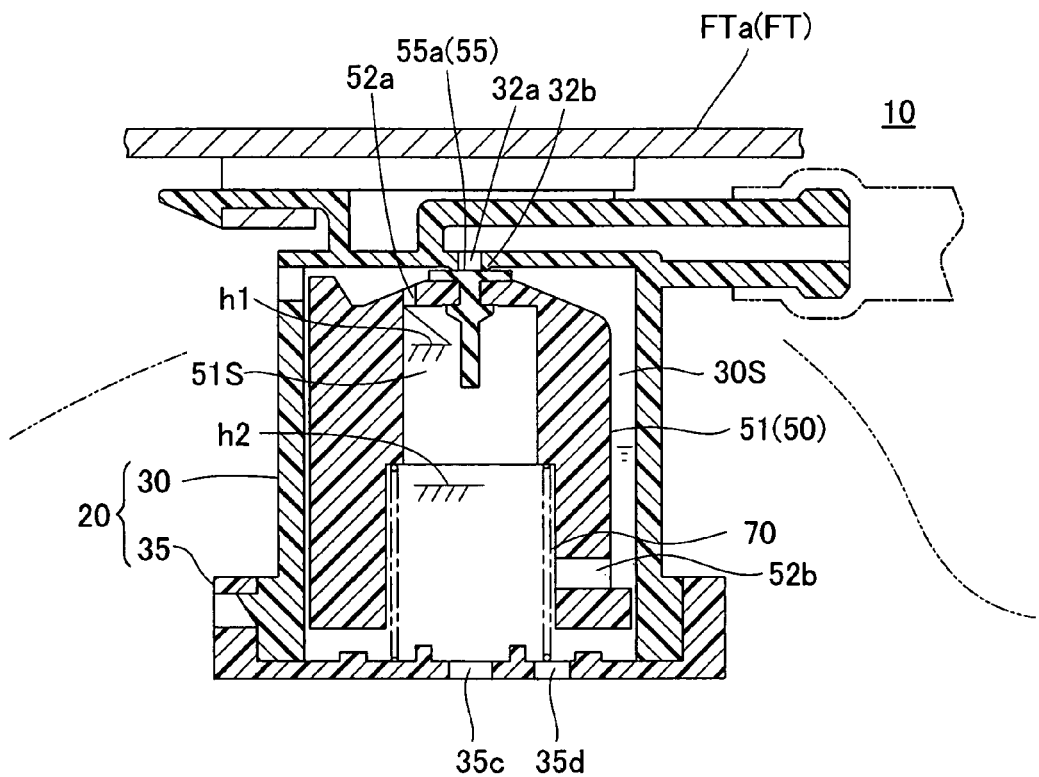
FIG. 6 shows operation of the fuel cutoff valve during vehicle sway.

FIG. 6 is an illustration depicting operation of the fuel cutoff valve 10 during vehicle sway. In the event that, with the fuel level close to the full tank level, the fuel tank FT should sway due to sudden turning of the vehicle, the liquid level in the fuel tank FT will surge as shown by the double-dot and dash line in FIG. 6. Fuel will flow into the float chamber 51S of the float 51 via the basal communicating holes 35c, 35d of the bottom plate. Since the rate of rise in fuel level at this time is high, while the amount of vapors escaping through the upper vent hole 52a of the float is small, the buoyant force of the vapors accumulated within the float chamber 51S is appreciable. When the fuel level in the float chamber 51S reaches height h2, the buoyant force and upward force of the spring 70 overcome the weight of the float 51, whereupon the float 51 bobs up. Due to the rise of the float 51, the seat member 55 becomes seated in the seal portion 32b, closing off the connection conduit 32a. Fuel is thereby prevented from flowing out from the fuel tank FT during sharp turning of the vehicle.

(4) Effects of the Fuel Cutoff Valve

The constitution of the embodiment discussed above affords the following effects.

(4)-1 As shown in FIG. 4, with the fuel level close to the full tank level, when pressure in the fuel tank FT reaches a high level due to tilting of vehicle, making it necessary for a large volume of fuel vapors to outflow to the canister, the side portion communication hole 52b formed in the lower part of the side wall portion 51b of the float 51 will allow the vapors inside the float chamber 51S to escape. Thus, the rising vapor entering the float chamber 51S will not produce large force that would cause the float 51 to rise. Moreover, the rising vapor enters the upper space of the valve chamber 30S from the side wall portion 51b, causing the pressure to rise through a passage above the float 51, thus checking the ascending force of the float 51. Consequently, a high level of occluding force closing the fuel cutoff valve 10 can be achieved by means of the large rising vapor.

(4)-2 As shown in FIG. 5, where the liquid level rises gradually due to tilting of the vehicle or the like, the upper vent hole 52a of the upper wall portion 51a of the float 51 acts as a passage for expelling vapors inside the float chamber 51S to the outside. Consequently, the float chamber 51S does not fill up with fuel and give rise to buoyant force causing the float 51 to rise, so the valve closure level of the fuel cutoff valve 10 can be set to a high level. Thus, the valve can be adapted to systems employing a flat fuel tank, for which a high valve closure level is desirable.

(4)-3 As shown in FIG. 6, when fuel level rises rapidly due to a sudden turn by the vehicle or the like, the ascending force created by collision of fuel against the lower face of the float 51 and the buoyant force associated with the fact that vapors are not sufficiently vented from the float chamber 51S through the upper vent hole 52a together cause the float 51 to rise rapidly, closing off the connection conduit 32a. Consequently, fuel can be prevented from flowing out from the fuel tank when the vehicle turns suddenly.

(4)-4 As shown in FIG. 6, even if the level in the fuel tank FT surges when the vehicle sways, since the basal communicating holes 35c, 35d of the bottom plate 35 are positioned facing the bottom face of the float 51 and are situated facing the gap between the outside periphery of the float 51 and the inside wall of the casing body 30, fuel entering through the basal communicating holes 35c, 35d will contact the float 51, and not flow directly to the outside from the connection conduit 32a.

(4)-5 The ascending force of the float 51 depends on the difference between downwardly directed force produced by the weight the float 51, and upwardly directed force combining buoyant force with urging force of the spring 70. With the fuel cutoff valve 10 in the submerged state, buoyant force is low, and among the upwardly directed forces the urging force of the spring 70 is relatively high. Thus, the spring force of the spring 70 can be set to a high value, without giving consideration to the buoyant force of the float chamber 51S, which tends to increase or decrease with fluctuations in air temperature. Specifically, the spring force of the spring 70 can be easily set to a value such that high sealing ability can be maintained, even in instances where the fuel cutoff valve 10 is subjected to vibration of the vehicle with the fuel cutoff valve 10 in the submerged state. Even if the vehicle rolls over, the consistent urging force of the spring 70 is applied to the seal portion 32b so that a consistent seal can be maintained.

(4)-6 Since the float 51 extends down below the side portion communication hole 52b, the float 51 is guided over a range of appreciable length while supported by the inside wall of the casing body 30, thus checking tilting of the float 51. Consequently, through the float 51 extends downward by an appreciable length, even if the fuel level should reach the lower end of the float 51, due to the upper vent hole 52a and the side portion communication hole 52b, buoyant force is not immediately produced in the float chamber 51S, so the liquid level at which the float 51 begins to move can be raised to a point above the upper end of the float 51, and thus the fuel level at which the float 51 begins to rise, i.e. the draft line, can be raised, and the ascending/descending operation of the float 51 can be stabilized.

The invention is not limited to the preceding embodiment, and can be reduced to practice in various other forms without departing from the spirit thereof. For example, the following modifications are possible.

In the preceding embodiment, the fuel cutoff valve is installed on the inside of the fuel tank, i.e. a so-called in-tank design, but is not limited thereto and may be adapted as well to arrangements wherein the valve is welded to the upper face of the upper wall of the fuel tank, with its bottom part being inserted through a mounting hole.

An arrangement wherein the upper vent hole is formed in the upper wall portion of the float, or formed perforating the upper part of the side wall portion in the diametrical direction, is also possible; and the placement and shape thereof are not limited provided that vapors in the float chamber can escape from the upper part of the float.

Moreover, while the seat portion of the preceding embodiment is formed of rubber as a separate element from the float, it is not limited thereto, and could instead be formed of resin either integrally with or separate from the float.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A fuel cutoff valve that is mounted on an upper wall of a fuel tank, and opens and closes a connection conduit to connect the fuel tank and outside, the fuel cutoff valve comprising:
    a casing forming a valve chamber for connecting the fuel tank interior with the connection conduit; and
    a float mechanism having (i) a float that is housed within the valve chamber and that rises and falls according to a fuel level within the valve chamber, and (ii) a seat portion disposed on an upper portion of the float, for opening and closing the connection conduit;
    wherein the float includes (i) a horizontally formed upper wall portion furnished with the seat portion, (ii) a side wall portion extending downwardly from a periphery of the upper wall portion, (iii) a float chamber that is formed with the upper wall portion and the side wall portion, and opens at a bottom of the float, (iv) an upper vent hole formed in the upper wall portion of the float for connecting the float chamber with the valve chamber and located at a side of the seat portion, and (v) a side communicating hole formed in the side wall portion below the upper vent hole for connecting the float chamber with the valve chamber,
    wherein the upper vent hole passes through the upper wall portion in a vertical direction,
    wherein the upper vent hole is formed to have greater air flow resistance than the side communicating hole and communicates the float chamber with the valve chamber even when the seat portion closes the connection conduit, and
    the float chamber is configured to be filled with fuel until a position of the upper wall portion.

2. The fuel cutoff valve according to claim 1, wherein
    the side communicating hole has a first passage area, the first passage area being configured to allow vapor entering the float chamber to flow out the valve chamber for preventing the float from rising, and
    the upper vent hole has a second passage area, the second passage area being configured to meet a first and second condition, wherein
    the first condition is that when the fuel rises at a first rate of rise and blocks the side communicating hole, vapor flows from the float chamber to the valve chamber and the fuel fills the float chamber, causing the float to rise, and
    the second condition is that when the fuel rises at a second rate of rise faster than the first rate of rise and blocks the side communicating hole, vapor stays in the float chamber and the fuel enters a lower part of the float chamber, causing the float to rise.

3. The fuel cutoff valve according to claim 1, wherein the connection conduit has a passage area that is smaller than that of the side communicating hole.

4. The fuel cutoff valve according to claim 1, wherein the casing comprises a bottom plate for closing a bottom opening of the valve chamber, and the bottom plate comprises basal communicating holes formed facing an lower end of the float and connecting the fuel tank with the valve chamber.

5. The fuel cutoff valve according to claim 1, wherein the float mechanism comprises a rubber seat member installed on an upper part of the float, the seat portion being formed on an upper face of the seat member.

6. The fuel cutoff valve according to claim 1, further comprising a spring that presses the float in an upward direction.

7. A fuel cutoff valve that is mounted on an upper wall of a fuel tank, and opens and closes a connection conduit to connect the fuel tank and outside, the fuel cutoff valve comprising:
    a casing forming a valve chamber for connecting the fuel tank interior with the connection conduit; and
    a float mechanism having (i) a float that is housed within the valve chamber and that rises and falls according to a fuel level within the valve chamber, and (ii) a seat portion disposed on an upper portion of the float, for opening and closing the connection conduit;

wherein the float includes (i) an upper wall portion, on which the seat portion is provided, (ii) a side wall portion extending downwardly from a periphery of the upper wall portion, (iii) a float chamber that is formed with the upper wall portion and the side wall portion, and opens at a bottom of the float, (iv) an upper vent hole formed in the upper wall portion of the float for connecting the float chamber with the valve chamber and located at a side of the seat portion, and (v) a side communicating hole formed in the side wall portion below the upper vent hole for connecting the float chamber with the valve chamber, wherein the float includes an upper end surface, which faces an upward direction and is generally transverse to a longitudinal axis of the float;

wherein the upper vent hole passes through the float from an upper end of the float chamber to the upper end surface of the float, wherein the upper vent hole is formed to have greater air flow resistance than the side communicating hole and communicates the float chamber with the valve chamber even when the seat portion closes the connection conduit, and the float chamber is configured to be filled with fuel to a position of the upper wall portion.

8. The fuel cutoff valve according to claim 7, wherein the side communicating hole has a first passage area, the first passage area being configured to allow vapor entering the float chamber to flow out the valve chamber for preventing the float from rising, and the upper vent hole has a second passage area, the second passage area being configured to meet a first and second condition, wherein the first condition is that when the fuel rises at a first rate of rise and blocks the side communicating hole, vapor flows from the float chamber to the valve chamber and the fuel fills the float chamber, causing the float to rise, and the second condition is that when the fuel rises at a second rate of rise faster than the first rate of rise and blocks the side communicating hole, vapor stays in the float chamber and the fuel enters a lower part of the float chamber, causing the float to rise.

9. The fuel cutoff valve according to claim 7, wherein the connection conduit has a passage area that is smaller than that of the side communicating hole.

10. The fuel cutoff valve according to claim 7, wherein the casing comprises a bottom plate for closing a bottom opening of the valve chamber, and the bottom plate comprises basal communicating holes formed facing an lower end of the float and connecting the fuel tank with the valve chamber.

11. The fuel cutoff valve according to claim 7, wherein the float mechanism comprises a rubber seat member installed on an upper part of the float, the seat portion being formed on an upper face of the seat member.

12. The fuel cutoff valve according to claim 7, further comprising a spring that presses the float in an upward direction.

* * * * *